(12) United States Patent
Isomura et al.

(10) Patent No.: US 8,148,030 B2
(45) Date of Patent: Apr. 3, 2012

(54) SEPARATION MEMBRANE FOR FUEL CELL AND PRODUCTION METHOD THEREOF

(75) Inventors: Takenori Isomura, State College, PA (US); Kenji Fukuta, Tsukuba (JP); Hiroyuki Yanagi, Tsukuba (JP)

(73) Assignee: Tokuyama Corporation, Yamaguchi (JP)

(*) Notice: Subject to any disclaimer, the term of this patent is extended or adjusted under 35 U.S.C. 154(b) by 0 days.

(21) Appl. No.: 12/864,325

(22) PCT Filed: Jan. 29, 2009

(86) PCT No.: PCT/JP2009/051474
§ 371 (c)(1), (2), (4) Date: Jul. 23, 2010

(87) PCT Pub. No.: WO2009/096473
PCT Pub. Date: Aug. 6, 2009

(65) Prior Publication Data
US 2010/0297530 A1   Nov. 25, 2010

(30) Foreign Application Priority Data
Jan. 29, 2008 (JP) .................. 2008-017274

(51) Int. Cl.
*H01M 8/10* (2006.01)
(52) U.S. Cl. .................. 429/492; 429/491
(58) Field of Classification Search ........... 429/479–492
See application file for complete search history.

(56) References Cited

U.S. PATENT DOCUMENTS

| 5,087,345 | A  | * | 2/1992 | Kashiwada et al. ........ 204/295 |
| 6,852,423 | B2 | * | 2/2005 | Schadler et al. ............ 428/514 |
| 2003/0087972 | A1 |   | 5/2003 | Taniguchi et al. |
| 2010/0081029 | A1 | * | 4/2010 | Fukuta et al. .................. 429/33 |

FOREIGN PATENT DOCUMENTS

| EP | 1796194 A1   | 6/2007 |
| EP | 1 901 379 A1 | 3/2008 |
| JP | 111351357 A  | 5/1999 |
| JP | 11273695 A   | 10/1999 |
| JP | 2000331693 A | 11/2000 |
| JP | 2001236973 A | 8/2001 |
| JP | 2007-042617  | 2/2007 |
| JP | 2007-123259  | 5/2007 |

(Continued)

OTHER PUBLICATIONS

English Abstract of JP 2000331693.

(Continued)

*Primary Examiner* — Barbara Gilliam
*Assistant Examiner* — Gary Harris
(74) *Attorney, Agent, or Firm* — Cahn & Samuels, LLP

(57) ABSTRACT

Disclosed is a process for producing a diaphragm for a fuel cell comprising a modified anion exchange membrane that substantially maintains durability and hydroxide ion conductivity as an electrolyte membrane and has improved resistance to methanol permeation. The process is characterized by comprising the step of impregnating at least one side of a crosslinked hydrocarbon anion exchange membrane with a polymerizable acidic compound having a weight average molecular weight of not less than 700 and less than 8000, provided that, when the acid site in the compound has been neutralized with a counter cation, the weight of the counter cation is subtracted from the molecular weight, and polymerizing the polymerizable acidic compound.

6 Claims, 2 Drawing Sheets

FOREIGN PATENT DOCUMENTS

| | | |
|---|---|---|
| WO | 2006028292 A1 | 3/2006 |
| WO | 2007004716 A1 | 1/2007 |

OTHER PUBLICATIONS

English Abstract of WO 2006028292.
English translation of International Preliminary Report on Patentability and Written Opinion dated Aug. 31, 2010.
English Abstract of JP 11 1351357 (A).
English Abstract of JP 11273695 (A).
English Abstract of JP 2007-042617.
English Abstract of JP 2007-123259.
Supplementary European Search Report in EP Application No. 09 70 6059 dated Nov. 29, 2011.

* cited by examiner

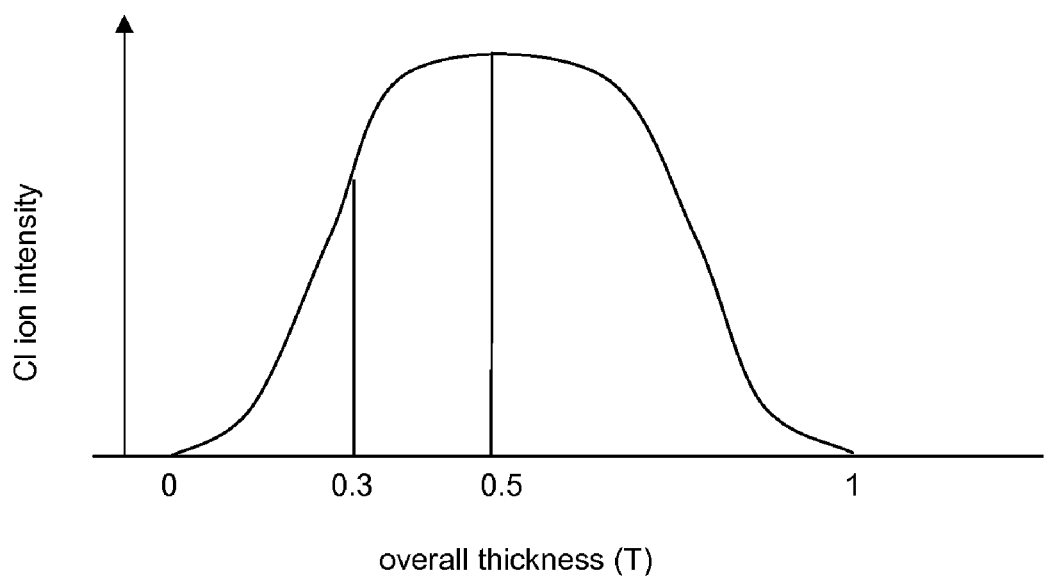

SEPARATION MEMBRANE FOR FUEL CELL AND PRODUCTION METHOD THEREOF

This application is a U.S. national stage application of PCT/JP2009/051474 filed on Jan. 29, 2009 and claims priority of Japanese patent document 2008-017274 filed on Jan. 29, 2008 in Japan, the entireties of which are incorporated herein by reference.

TECHNICAL FIELD

The present invention relates to a separation membrane for a fuel cell and a production method thereof; and specifically relates to a separation membrane for a fuel cell preferably used for a direct liquid fuel type fuel cell using liquid methanol, etc. as its fuel and a production method thereof. Particularly, the present invention relates to a separation membrane for a fuel cell comprising a modified anion-exchange membrane, showing higher ion-complexation in a surface region of the membrane, inhibiting methanol crossover phenomenon and showing high hydroxide ion conductivity, and a production method thereof.

DESCRIPTION OF THE RELATED ART

A fuel cell is a power generation system in which fuel and an oxidizing agent are continuously supplied to take out chemical energy generated in the reaction thereof as electric power. The fuel cell is, depending on a kind of electrolytes used therein, roughly divided into those having relatively low operation temperature such as an alkaline, phosphoric acid and solid polymer electrolyte type fuel cell, and those having high operation temperature such as a molten carbonate and solid oxide electrolyte fuel cell.

Among these, in the solid polymer electrolyte type fuel cell, both sides of a separation membrane acting as a solid polymer electrolyte are joined with diffusion electrodes supporting a catalyst; hydrogen as a fuel is supplied into a chamber (fuel chamber) including one of the diffusion electrodes while oxygen or oxygen containing gas, such as air, as an oxidizing agent is supplied into a chamber (oxidizing agent chamber) including the other gas diffusion electrode; and an external load circuit is connected between both gas diffusion electrodes to function as a fuel cell.

The solid polymer type fuel cell has, as shown in FIG. 1, a basic structure wherein a space surrounded by cell bulkhead 1 having a fuel flow hole 2 and oxidizing gas flow hole 3, respectively communicated with outside, is divided by a membrane assembly in which a fuel chamber side diffusion electrode 4 and an oxidizing agent chamber side gas diffusion electrode 5 are respectively bonded to both surfaces of a solid polymer electrolyte membrane 6 to form a fuel chamber 7 communicated with outside via the fuel flow hole 2 and an oxidizing agent chamber 8 communicated with outside via the oxidizing gas flow hole 3. Then, in the solid polymer type fuel cell having the above basic structure, hydrogen gas or liquid fuel such as methanol, etc. is supplied into said fuel chamber 7 via the fuel flow hole 2, and oxygen or oxygen containing gas such as air to act as an oxidizing agent is supplied into the oxidizing agent chamber 8 via the oxidizing gas flow hole 3. Furthermore, an external load circuit is connected between both diffusion electrodes to generate electric energy by the following mechanism.

When using a cation-exchange type electrolyte membrane as the solid electrolyte membrane 6, a proton (hydrogen ion) generated by contacting a fuel with a catalyst included in the fuel chamber side diffusion electrode 4 conducts in the solid polymer electrolyte membrane 6 and moves into the oxidizing agent chamber 8 to generate water by reacting with oxygen in the oxidizing agent gas in the oxidizing agent chamber side gas diffusion electrode 5. On the other hand, an electron, generated in the fuel chamber side diffusion electrode 4 simultaneously with the proton, moves to the oxidizing agent chamber side gas diffusion electrode 5 through the external load circuit, so that it is possible to use the energy from the above reaction as an electric energy.

In a solid polymer type fuel cell wherein the cation-exchange type electrolyte membrane is used for a solid electrolyte membrane, a perfluorocarbon sulfonic acid resin membrane is most commonly used as the cation-exchange type electrolyte membrane. However, the following problems are identified in the cation-exchange type fuel cell using the perfluorocarbon sulfonic acid resin membrane.

(i) Only a noble metal catalyst is usable due to the strongly acidic reaction field, and the perfluorocarbon sulfonic acid resin membrane is also expensive, so that there are limitations in cost reduction.

(ii) It requires replenishing water due to insufficient water retaining capacity.

(iii) It is difficult to reduce electric resistance by decreasing a thickness of the membrane due to low physical strength.

(iv) When using liquid fuel, such as methanol, as its fuel, because of high permeability of liquid fuel, liquid fuel arriving at an oxidizing agent chamber side gas diffusion electrode reacts with oxygen or air on the surface thereof, causing increase in overvoltage and reduction of output voltage. Also, when leaking the liquid fuel such as methanol into the oxidizing agent chamber, usage efficiency of the liquid fuel is reduced. This phenomenon is called "methanol crossover".

To solve the above-mentioned problems, especially the above problem (i), it has been examined to use hydrocarbon-based anion-exchange membrane instead of perfluorocarbon sulfonic acid resin membrane, and several of such solid polymer type fuel cells have been already proposed (Patent Articles 1 to 3). In this case, a mechanism for generating electric energy in the solid polymer type fuel cell is different in ion species moving in the solid polymer electrolyte membrane 6 as below. Namely, hydrogen or liquid fuel such as methanol is supplied into the fuel chamber side, and oxygen and water are supplied into the oxidizing agent chamber side, so that the catalyst included in the electrode is contacted with the oxygen and water in the oxidizing agent chamber side gas diffusion electrode 5 to generate hydroxide ion. The hydroxide ion conducts in the solid polymer electrolyte membrane 6 formed by the above hydrocarbon-based anion-exchange membrane to move into the fuel chamber 7, and reacts with the fuel in the fuel chamber side diffusion electrode 4 to generate water. An electron generated as a result of the reaction in the fuel chamber side diffusion electrode 4 moves into the oxidizing agent chamber side gas diffusion electrode 5 through the external load circuit, so that the reaction energy is used as an electric energy.

Thus, when using the above-mentioned hydrocarbon-based anion-exchange membrane, the obtained direct liquid fuel type fuel cell can normally be greatly improved in the problems (ii) to (iii) as well as the above problem (i), and it is further expected that the problem (iv) may be greatly reduced since a hydroxide ion having a large diameter moves from the oxidizing agent chamber side to the fuel chamber side when applying current.

There have been proposed several anion-exchange membranes to be a solid polymer electrolyte membrane, specifically including a membrane formed by filling a porous membrane such as fabric cloth with a hydrocarbon-based crosslinked polymer having an anion-exchange group such as a quaternary ammonium group and a quaternary pyridinium base (Patent Article 1) and a membrane formed by introducing a quaternary ammonium group into hydrocarbon-based engineering plastics followed by cast film-forming (Patent Article 2), as well as a membrane formed by graft polymerization of hydrocarbon-based monomers having an anion-exchange group in a base material comprising a fluorine-containing polymer (Patent Article 3), etc. All these aim at improvement in methanol crossover in said (iv), and show notable effect compared to the perfluorocarbon sulfonic acid membrane, but the effect is not sufficient in terms of usefulness.

Meanwhile, the present inventors proposed a membrane, obtained by penetrating a polymerizable monomer having an anion-exchange group and relatively low molecular weight in a base ion-exchange membrane obtained by filling up a porous membrane with cross-linked cation-exchange resin and polymerizing the penetrated polymerizable monomer, as a cation-exchange membrane with methanol permeability notably reduced by forming ion complexes in a cation-exchange membrane at high rates (Patent Article 4). The cation-exchange membrane is, as mentioned above, high in methanol permeation resistance and thus very useful, but it is less than sufficient in terms of proton conductivity since ion complexes are formed throughout entire region in the membrane at high rates to achieve this. Namely, it is difficult to maintain high proton conductivity while improving methanol permeation resistance, remaining possibilities for further improvements.

[Patent Article 1] Japanese Unexamined Patent Publication No. H11-135137
[Patent Article 2] Japanese Unexamined Patent Publication No. H11-273695
[Patent Article 3] Japanese Unexamined Patent Publication No. 2000-331693
[Patent Article 4] International Publication Pamphlet No. 2006/028292

DISCLOSURE OF INVENTION

Problem to be Solved by the Invention

The present invention was done in view of the above prior arts, aiming at providing a probable method for producing a separation membrane for a fuel cell which is a modified anion-exchange membrane, maintaining durability of an electrolyte membrane and hydroxide ion conductivity and improving permeation resistance of liquid fuel such as methanol.

Means for Solving the Problem

The gist of the present invention for solving the above problems is summarized as follows.

(1) A production method of a separation membrane for a fuel cell comprising: impregnating at least one side of a cross-linked hydrocarbon-based anion-exchange membrane with a polymerizable acidic compound having weight-average molecular weight (where a weight of a counter cation is eliminated from the molecular weight when its acidic moiety of the compound is neutralized by the counter cation) of 700 or more to less than 8000; and polymerizing the polymerizable acidic compound.

(2) The production method described in the above (1), wherein said hydrocarbon-based anion-exchange membrane is impregnated with said polymerizable acidic compound to make a concentration of the polymerizable acidic compound in a surface region of the exchange membrane higher than a concentration of the polymerizable acidic compound in a central region of the exchange membrane.

(3) The production method described in the above (1), wherein the acidic moiety of said polymerizable acidic compound is a carboxylic acid group.

(4) The production method described in the above (1), wherein said polymerizable acidic compound is at least one selected from a polyacrylic acid polymer, a polymethacrylic acid polymer, a poly(acrylic acid-methacrylic acid) copolymer and salts thereof, having an ethylenically unsaturated group at least one end of its molecular chain.

(5) The production method described in any of the above (1) to (4), wherein said fuel cell is a direct liquid fuel type fuel cell.

(6) A separation membrane for a fuel cell, comprising a cross-linked hydrocarbon-based anion-exchange membrane as a base material, wherein the membrane is modified so that a surface region on at least one side of the anion-exchange membrane is highly ion-complexed compared to a central region of the anion-exchange membrane.

(7) The separation membrane for a fuel cell described in the above (6), wherein: when ion-exchanging an ion-exchangeable anion in said modified anion-exchange membrane into a Cl ion, calculating a cumulative intensity of the Cl ion in thickness direction of the ion-exchanged membrane by X-ray microanalyzer analysis, and an overall thickness of the modified anion-exchange membrane is defined as T, a ratio ($Cl_{0.3}/Cl_{0.5}$), of a Cl ion cumulative intensity ($Cl_{0.3}$) in a region from a top surface of at least one side of the modified anion-exchange membrane to a depth of 0.3 T and a Cl ion cumulative intensity ($Cl_{0.5}$) in a region from the top surface to a depth of 0.5 T, is 0.05 to 0.55.

Effects of the Invention

According to the present invention, there is provided a separation membrane for a fuel cell which is a modified anion-exchange membrane, having almost maintained durability of an electrolyte membrane and hydroxide ion conductivity, and also having improved permeation resistance of liquid fuel such as methanol. This modified anion-exchange membrane has the highly ion-complexed surface region to effectively inhibit methanol crossover phenomenon, so that usage efficiency of the liquid fuel is excellent, and therefore, a fuel cell produced by using this membrane can be distinctly superior in terms of economy. In addition, it shows high hydroxide ion conductivity, so that high output voltage can be obtained. Therefore, such a modified anion-exchange membrane is preferably used as a separation membrane for a direct liquid fuel type fuel cell particularly using liquid methanol, liquid ethanol, etc. as its fuel.

BRIEF DESCRIPTION OF THE DRAWINGS

FIG. 2 shows a typical example of a Cl ion intensity spectrum by X-ray microanalyzer analysis (EPMA) for a modified hydrocarbon-based anion-exchange membrane after ion-exchanging into a Cl ion.

DETAILED DESCRIPTION OF THE INVENTION

Figure 1:
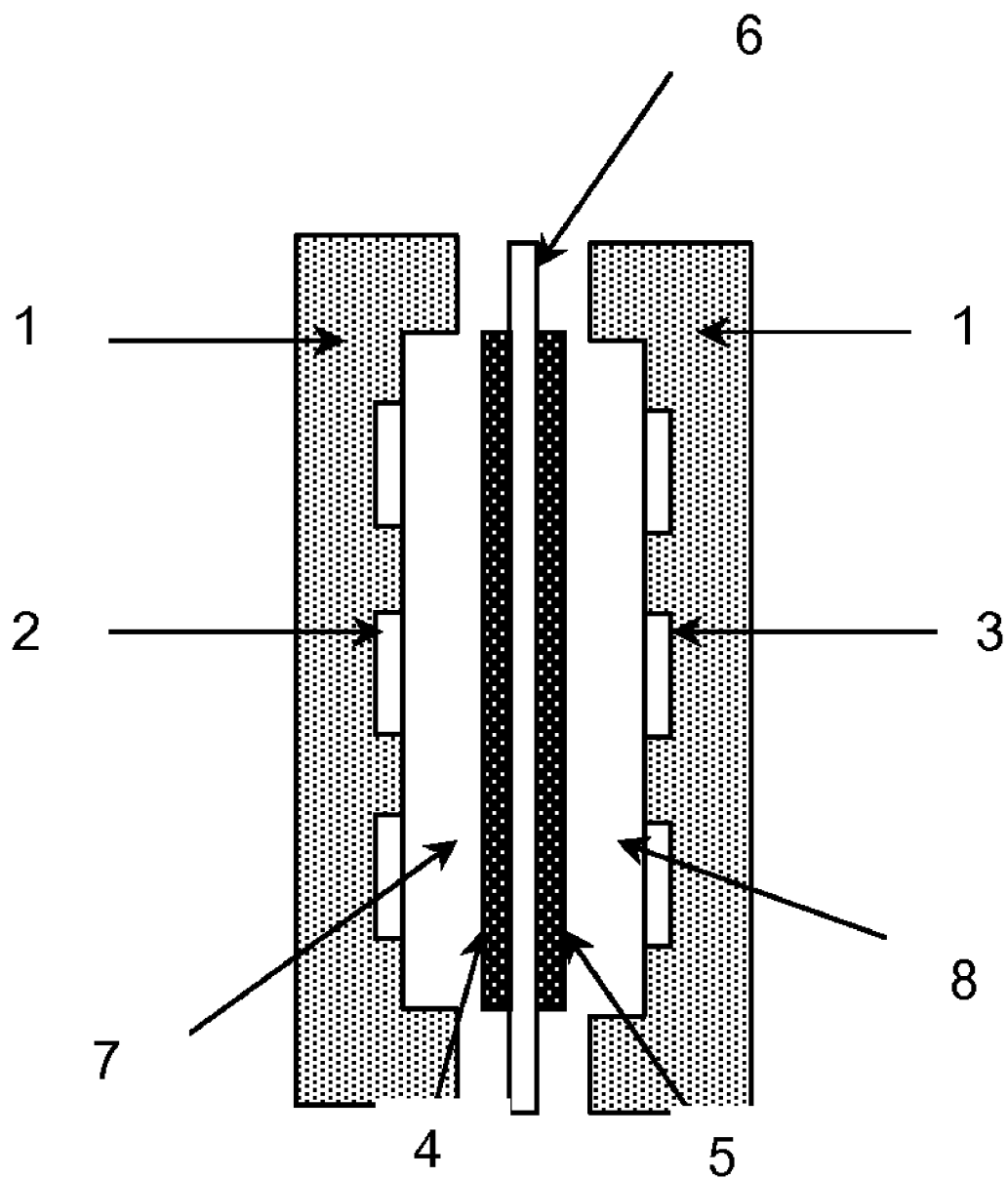
FIG. 1 is a conceptual diagram showing a basic structure of a solid polymer type fuel cell.

Hereinafter, the present invention including its best mode will be explained in detail.

A production method of a separation membrane for a fuel cell according to the present invention includes the steps of: impregnating a cross-linked hydrocarbon-based anion-exchange membrane with a polymerizable acidic compound; and polymerizing the polymerizable acidic compound.

(Cross-Linked Hydrocarbon-Based Anion-Exchange Membrane)

The cross-linked hydrocarbon-based anion-exchange membrane may be a membrane comprising a cross-linked hydrocarbon-based polymer in which anion-exchange groups are directly bonded to its main chain and side chain, or a membrane in which cross-linked anion-exchange polymers are nonhomogeneously distributed in a hydrocarbon-based polymer. In the latter cross-linked hydrocarbon-based anion-exchange membrane in which the cross-linked anion-exchange polymers are nonhomogeneously distributed in the hydrocarbon-based polymer, the hydrocarbon-based polymer acts as a reinforced portion, so that without sacrificing electric resistance, etc., the physical strength of the anion-exchange membrane can be enhanced, and therefore it is possible to preferably use in the present invention.

Note that in the present invention, a hydrocarbon-based polymer means a polymer substantially containing no carbon-fluorine bond in which most parts (excluding a part of the anion-exchange group in the anion-exchange polymer) of bonds in main chain and side chain constituting the polymer are carbon-carbon bonds. In this case, trace amounts of other atoms such as oxygen, nitrogen, silicon, sulfur, boron and phosphorus may be included as an ether bond, ester bond, amide bond, siloxane bond, etc., in the bonds constituting the main chain and side chain of the polymer. Also, all of the atoms bonding to the above main chain and side chain are not necessarily hydrogen atoms, and very small amount of the atoms can be substituted by other atoms such as chlorine, bromine and iodine or any substituent group containing other atoms. Amount of these other elements except for carbon and hydrogen is preferably 10 mol % or less, more preferably 5 mol % or less, in all elements constituting resin (but excluding elements of the part of the anion-exchange group in the anion-exchange polymer).

As the anion-exchange group, any anion-exchange group of the conventionally known hydrocarbon-based anion-exchange membranes can be used without any limitation. Specifically, there may be mentioned a primary to tertiary amino group, quaternary ammonium group, pyridyl group, imidazole group, quaternary pyridinium base, sulfonium base, phosphonium base, etc. The quaternary cross-linked or quaternary pyridinium base is preferable because of excellent hydroxide ion conductivity and availability of the membrane materials, etc., and the quaternary ammonium group is most preferable. Also, the anion-exchange group may either be a hydroxide ion type or other ion type including halogen ion, such as a chloride ion, carbonate ion, bicarbonate ion, nitrate ion and sulfate ion, and furthermore, a salt thereof, acid, base and others may be included in the anion-exchange membrane.

Hereinafter, the latter hydrocarbon-based anion-exchange membrane in which the cross-linked anion-exchange polymers are nonhomogeneously distributed in the hydrocarbon-based polymer will be explained. As the cross-linked hydrocarbon-based anion-exchange membrane in which the cross-linked anion-exchange polymers are nonhomogeneously distributed in the hydrocarbon-based polymer, a membrane in which the cross-linked anion-exchange polymers are in a void part of a porous membrane comprising the hydrocarbon-based polymer is particularly preferable.

A form of the porous membrane comprising the hydrocarbon-based polymer is not particularly limited, and porous film, fabric cloth, unwoven cloth, paper, etc. can be used without any limitation. As a material, thermoplastic polymer composition, thermosetting polymer composition or mixture thereof may be used, and the thermoplastic polymer composition is preferable because of its ease of production and high adhesion strength with the cross-linked hydrocarbon-based anion-exchange polymer. As the thermoplastic polymer composition, there may be exemplified a polyolefin polymer such as homopolymer or copolymer of α-olefin including ethylene, propylene, 1-butene, 1-pentene, 1-hexene, 3-methyl-1-butene, 4-methyl-1-pentene and 5-methyl-1-heptene; a vinyl chloride-based polymer such as polyvinyl chloride, vinyl chloride-vinyl acetate copolymer, vinyl chloride-vinylidene chloride copolymer and vinyl chloride-olefin copolymer; a polyamide polymer such as nylon 6 and nylon 66, polyimide, etc. Among these, it is particularly preferable to use the polyolefin polymer because of its excellent mechanical strength, chemical stability and chemical resistance as well as its good compatibility to the cross-linked hydrocarbon-based anion-exchange polymer. As the polyolefin polymer, polyethylene or polypropylene polymer is particularly preferable, and polyethylene polymer is most preferable. Polyolefin polymer porous film is further preferable since this is easy to obtain those having an appropriate average pore diameter and is excellent in strength, and polyethylene polymer porous film is particularly preferable.

These porous films can be obtained by, for example, a method described in Japanese Unexamined Patent Publication No. H9-216964, Japanese Unexamined Patent Publication No. 2002-338721, etc.; alternatively, it is also possible to use a commercialized product (e.g. "Hipore" of Asahi Kasei Corporation, "Upore" of Ube Industries, Ltd., "Setela" of Tonen-Tapils Co., Ltd., "Expole" of Nitto Denko Corporation, "Hilet" of Mitsui Chemical Inc., etc.)

An average pore diameter of the porous membrane comprising the hydrocarbon-based polymer is, in view of electric resistance and mechanical strength of the hydrocarbon-based anion-exchange membrane, generally preferably 0.005 to 5.0 µm, more preferably 0.01 to 1.0 µm and most preferably 0.015 to 0.4 µm. When producing the separation membrane by using a porous membrane with an average pore diameter of 0.005 µm or less, an amount of the ion-exchange resin filled into void of the porous membrane is insufficient, so that it may not be possible to obtain sufficient hydroxide ion conductivity. When producing the separation membrane by using a porous membrane with an average pore diameter of 5.0 µm or more, it is difficult to obtain the separation membrane having low methanol permeability.

Also, porosity of the porous membrane comprising the hydrocarbon-based polymer is, in view of electric resistance and mechanical strength of the hydrocarbon-based anion-exchange membrane, generally preferably 20 to 95%, more preferably 30 to 90% and most preferably 30 to 65%. Also, air permeability (JIS P-8117) of the porous membrane is preferably 1500 seconds or less, particularly preferably 1000 seconds or less. Surface smoothness of the porous membrane is preferably 10 µm or less, more preferably 5 µm or less in terms of roughness exponent. This constitution allows increasing adhesiveness with the gas diffusion electrode, so that it is possible to obtain a separation membrane for a fuel cell showing higher output.

The cross-linked hydrocarbon-based anion-exchange membrane may be produced by any method, and is generally preferably produced by the following method. Namely, there may be mentioned a method wherein void part of a porous membrane comprising a hydrocarbon-based polymer is impregnated with a monomer composition comprising a polymerizable monomer having an anion-exchange group or a functional group introducible of anion-exchange group, a crosslinkable monomer and a polymerization initiator, followed by polymerizing the above monomer composition and if necessary, introducing an anion-exchange group.

In the production method, as the polymerizable monomer having a functional group introducible of anion-exchange group or the polymerizable monomer having an anion-exchange group, it is possible to use any hydrocarbon-based monomer used in conventionally known production methods of an anion-exchange polymer without particular limitation. Specifically, as the polymerizable monomer having a functional group introducible of anion-exchange group, there may be mentioned chloromethylstyrene, chloroethylstyrene, chloropropyl styrene, chlorobutyl styrene, chloropentyl styrene, bromomethyl styrene, bromoethyl styrene, bromopropyl styrene, bromobutyl styrene, bromopentyl styrene, iodomethyl styrene, iodoethyl styrene, iodopropyl styrene, iodobutyl styrene, iodopentyl styrene, styrene, vinyl toluene, vinyl xylene, α-methylstyrene, vinyl naphthalene, α-halogenated styrenes, or allylamine derivative such as allylamine, diallylamine, triallylamine and tetraallylamine as well as vinylamine derivative such as vinyl formamide. Also, as the polymerizable monomer having an anion-exchange group, salts obtained by amination of styrene derivative having halogenoalkyl group such as N,N,N-trimethyl styryl ammonium salt, salts of allylamine such as allylamine salt, diallylamine salt, triallylamine salt can be used.

Also, as the crosslinkable monomer, although not particularly limited, for example, a divinyl compound can be used, including divinylbenzenes, divinyl sulfone, butadiene, chloroprene, divinyl biphenyl, trivinyl benzenes, divinyl naphthalene, diallylamine and divinyl pyridines.

Furthermore, in addition to the above-described monomer having a functional group introducible of anion-exchange group, the monomer having an anion-exchange group and the crosslinkable monomer, other monomers copolymerizable of these monomers and plasticizers may be added if necessary. These other monomers include, for example, styrene, acrylonitrile, methyl styrene, acrolein, methyl vinyl ketone, vinyl biphenyl, etc. Also, the plasticizers include dibutyl phthalate, dioctyl phthalate, dimethyl isophthalate, dibutyl adipate, triethyl citrate, acetyl tributyl citrate, dibutyl sebacate, etc.

As the polymerization initiator, any conventionally known initiators can be used without any particular limitation. Specific examples for these polymerization initiators include organic peroxide such as octanoyl peroxide, lauroyl peroxide, t-butylperoxy-2-ethylhexanoate, benzoyl peroxide, t-butylperoxy isobutylate, t-butylperoxy laurate, t-hexylperoxy benzoate and di-t-butyl peroxide.

A ratio of each component constituting the monomer composition is not particularly limited and it is generally preferable to use 0.1 to 60 parts by weight, more preferably 1 to 50 parts by weight, of the crosslinkable monomer; 0 to 100 parts by weight of the other monomer copolymerizable of these monomers; and 0 to 50 parts by weight of the plasticizers if added; per 100 parts by weight of the monomer having a functional group introducible of anion-exchange group or the monomer having an anion-exchange group. Also, it is preferable to add 0.1 to 20 parts by weight, more preferably 0.5 to 10 parts by weight, of the polymerization initiator per 100 parts by weight of all polymerizable monomers.

A method to fill the porous membrane of the hydrocarbon-based polymer, which is a base material, with the above monomer composition is not particularly limited. For example, there may be illustrated a method to coat or spray the monomer composition on the porous membrane of the hydrocarbon-based polymer, or a method to dip the porous membrane into the monomer composition. When using dipping method, dipping time depends on the kind of the porous membrane and the composition of the suspension, and is generally 0.1 second to several tens of minutes.

As a method for polymerizing after filling the porous membrane of the hydrocarbon-based polymer with the monomer composition is not particularly limited, and any commonly-known method may properly be selected depending on the used polymerizable monomer and polymerization initiator. When using said organic peroxide as the polymerization initiator, a method for polymerizing by heat (thermal polymerization) can commonly be employed as the polymerization method. This method is easy to operate and allows relatively uniformly polymerizing, so that this is more preferable than other polymerization methods. At the polymerization, it is preferable to continue to apply pressure toward internal direction from external direction of the film by covering the porous membrane with its void portion impregnated with the monomer composition, by using polyester film, etc. By polymerizing as above, it is possible to prevent inhibition of polymerization caused by oxygen, and to make the surface of the obtained separation membrane flat and smooth. Furthermore, by pressurizing while covering the surface of said porous membrane with the film, the monomer composition excessively included in the porous membrane can be removed, resulting in a thin uniformly-polymerized membrane.

Polymerization temperature is not particularly limited, and commonly-known polymerize temperature conditions may properly be selected. In general, it is preferably 50 to 150° C., more preferably 60 to 120° C. Polymerization time is preferably 10 minutes to 10 hours, more preferably 30 minutes to 6 hours.

For the membrane-shaped material obtained by the above-described polymerization, it is possible to introduce the desired anion-exchange group therein by any commonly-known treatment such as amination, methylation, conversion to sulfonium salt and hydrolysis, if needed, to obtain the cross-linked hydrocarbon-based anion-exchange membrane.

Ion-exchange capacity of the cross-linked anion-exchange membrane used in the present invention is preferably 0.2 to 5 mmol/g, further preferably 0.5 to 3 mmol/g. Also, water content of the anion-exchange membrane is preferably 7% or more, more preferably 10% or more to hardly reduce hydroxide ion conductivity due to drying. In general, water content can be maintained to be 7 to 90% or so. Water content can be controlled by properly selecting the kind of the anion-exchange group, anion-exchange capacity and degree of cross-linkage. Furthermore, the anion-exchange membrane has a thickness of usually preferably 5 to 150 μm, more preferably 7 to 90 μm in view of suppressing membrane resistance and giving mechanical strength required as a support membrane.

(Polymerizable Acidic Compound)

In the present invention, the above cross-linked hydrocarbon-based anion-exchange membrane is impregnated with a solution of the polymerizable acidic compound with specific molecular weight, followed by polymerization.

The polymerizable acidic compound here means a compound having a polymerizable group and acidic moiety within its molecule. The polymerizable group is a group containing a carbon-carbon double bond and carbon-carbon triple bond, etc., and carbon-carbon double bond is preferable because of its good polymerizablility and availability, etc. Specifically, a group having an ethylenically unsaturated group such as a vinyl benzil group, vinyl group and allyl group may be mentioned. The positions of these polymerizable groups in the molecule are not particularly limited. These polymerizable groups can be bonded to the ends of molecular chain or side chain of the polymerizable acidic compound, and are normally preferably bonded to the end of the molecular chain. The number of the polymerizable groups per one molecule of the polymerizable acidic compound is preferably 1 or more, more preferably 2 or more. Furthermore, the maximum number of the polymerizable groups is normally 10 or less, preferably 5 or less. The most preferable number of the polymerizable groups is 2 when the groups are bonded to an end of the molecular chain. Also, the acidic moiety includes, for example, a sulfonic acid structure, carboxylic acid structure, phosphoric acid structure, phosphonic acid structure and phenol type hydroxyl group structure, etc., and a weakly acidic functional group structure may be preferable because of its high forming ability of ion complex, i.e. high methanol permeation resistance. Particularly, the carboxylic acid structure is most preferable. The acidic moiety is normally in the side chain of the polymerizable acidic compound, and neutralized by a counter cation including alkali metal ion such as sodium and potassium ions.

Weight-average molecular weight of the polymerizable acidic compound is 700 or more to less than 8000, preferably 700 or more to 5000 or less, further preferably 700 or more to 3000 or less and most preferably 800 or more to 2500 or less. Note that this weight-average molecular weight is calculated by eliminating the weight of the counter cation from the molecular weight in case the acidic moiety of the side chain in the polymerizable acidic compound is neutralized by the counter cation as described above. Thus-ionically-bonded counter cation part little influences its permeability when applying the polymerizable acidic compound on the surface of the anion-exchange membrane. Also, the polymerizable acidic compound is preferably dissolved in an appropriate solvent when applying. In this case, the counter cation is ionized to further weaken the influence in the above permeability, so that the weight of the counter cation is eliminated when calculating the weight-average molecular weight of the polymerizable acidic compound used in the present invention.

When the weight-average molecular weight of the polymerizable acidic compound used is too high, the impregnation of the polymerizable acidic compound into the anion-exchange membrane is not sufficient, so that an ion-complexed region with sufficient thickness cannot be formed in the surface region upon polymerization of the polymerizable acidic compound. As a result, it is hard to attain the desired improvement of methanol permeation resistance. On the other hand, when the weight-average molecular weight of the polymerizable acidic compound is too low, the anion-exchange membrane is uniformly impregnated with large amounts of the polymerizable acidic compound, so that the most parts of the ion-exchange membrane are ion-complexed upon polymerization of the polymerizable acidic compound. As a result, the methanol permeation resistance is improved but hydroxide ion conductivity is lowered, so that the purpose of the present invention is not attainable.

Note that the weight-average molecular weight of the above polymerizable acidic compound is as relatively high as more than 3000 to less than 8000, the permeability when being applied on the surface of the anion-exchange membrane tends to be lowered compared to the permeability when using the polymerizable acidic compound with lower weight-average molecular weight. Consequently, for more sufficient impregnation of the polymerizable acidic compound, it is preferable to use the anion-exchange membrane having lowest possible degree of cross-linkage, or the porous membrane as its base material with highest porosity possible; and alternatively, it is also preferable to use a solution containing the polymerizable acidic compound in highest possible concentration as a solution or fluid dispersion of the polymerizable acidic compound for the impregnation into the anion-exchange membrane; etc., in order to make it easier for the compound to penetrate. For example, when using the anion-exchange membrane having low degree of cross-linkage, it is common for a material of said anion-exchange membrane, i.e. the monomer composition, to use 0.1 to 60 parts by weight of the crosslinkable monomer per 100 parts by weight of the monomer having a functional group introducible of anion-exchange group or the monomer having an anion-exchange group, and when the weight-average molecular weight of the polymerizable acidic compound for the impregnation, it is favorable to use 3 parts by weight or less, particularly preferably 2.5 parts by weight or less, of the above crosslinkable monomer (also, when using the porous membrane as a base material with highest porosity for the anion-exchange membrane, it is favorable to use a porous membrane with porosity of 40% or more; when using a solution or fluid dispersion containing high concentration of the polymerizable acidic compound for the impregnation into the anion-exchange membrane, its concentration is favorably 4000 ppm or more).

As the polymerizable acidic compound, those having an ethylenically unsaturated group in at least one of the end of the molecular chain is preferable, and specific examples may include an oligomer of styrenesulfonic acid having the above property and a salt thereof, and an oligomer 2-(meth)acrylamido-2-methylpropane sulfonic acid having the above property and a salt thereof, as well as an oligomer of 2-(meth)acryloyloxyethyl dihydrogen phosphate having the above property and a salt thereof. These polymerizable acidic compounds can be obtained by a commonly-known synthetic method such as living polymerization using a metallic porphyrin catalyst, and a method similar to the later-mentioned synthetic method of polymerizable poly(meth)acrylic acid compound.

As a particularly preferable polymerizable acidic compound, a compound having a carboxylic acid group structure and an ethylenically unsaturated group derived from one or more acrylic acids or methacrylic acid can be preferably used. Specific examples of the polymerizable acidic compound may include a polymerizable poly(meth)acrylic acid compound having an ethylenically unsaturated group in at least one end of the molecular chain such as polyacrylic acid polymer, polymethacrylic acid polymer, poly(acrylic acid-methacrylic acid) copolymer and salt thereof (hereinafter also referred to as "polymerizable poly(meth)acrylic acid compound"). These polymerizable poly(meth)acrylic acid compounds may be a mixture of two or more compounds, or a mixture of the polymerizable poly(meth)acrylic acid compound and other polymerizable acidic compound. In these cases, obviously, the weight-average molecular weight of substantially all polymerizable acidic compounds may be within the above range. Note that a random copolymer is preferable when using poly(acrylic acid-methacrylic acid) copolymer because said impregnation into the anion-exchange membrane and subsequent polymerizing reaction can uniformly be conducted.

In the present invention, as the above polymerizable poly(meth)acrylic acid compound, those having an ethylenically unsaturated group in both ends of the molecular chain are preferable for increasing polymerizability and maintaining fuel permeation resistance over the long term; and it is preferable to use it alone or in a mixture with the compound having an ethylenically unsaturated group in only one end of the molecular chain.

A method for producing the polymerizable poly(meth) acrylic acid compound is not particularly limited, and any conventionally known synthetic procedure may be applicable. Also, a commercialized product may be used. For example, the compound can be synthesized by the following conventionally-known method (Michihiro Kawai, "Synthesis of Macromonomer by High-Temperature Polymerization and Its Reactivity", Toagosei Annual Research Report TREND, Jan. 1, 2002, Vol. 5, pp. 2-10). Namely, in this method, (meth) acrylic acid or its esters are, independently or in a mixture of two or more kinds, subject to thermal polymerization at high temperature in a small amount of time under the presence of a radical polymerization initiator, in which its ester portion is hydrolyzed by an acid or alkali when using (meth)acrylic acid esters as a starting material.

In the polymerizing step of this production method, growth reaction and degradation reaction commonly shown in the radical polymerization of high molecule concertedly proceed. In the growth reaction, monomers are successively polymerized to increase molecular weight. On the other hand, in the degradation reaction, hydrogen-abstraction reaction occurs on the main chain by a radical at a growing end, followed by β-scission reaction on the resulting radical region of the main chain, by which an ethylenically unsaturated group is introduced at the end of the resulting polymer. The latter degradation reaction is very slow at temperature region below 100° C., reaction temperature is generally 150 to 500° C., preferably 200 to 300° C., to efficiently introduce the ethylenically unsaturated group. These reactions may be solvent-free, or may be conducted in a solvent such as water, alcohols, acetone, dimethyl formamide, dimethyl sulfoxide, benzene, chloroform or mixture thereof at an arbitrary concentration. Note that it is more preferable to use (meth)acrylic acid esters as the starting material because many of these show relatively narrow molecular weight distribution which allows uniformly modifying the anion-exchange membrane near its surface.

(Impregnation)

In the present invention, at least one side of said cross-linked hydrocarbon-based anion-exchange membrane is impregnated with the above polymerizable acidic compound. The impregnation of the polymerizable acidic compound may be done either into both sides or in only one side of the cross-linked hydrocarbon-based anion-exchange membrane, and preferably into both sides.

A method for impregnation of the polymerizable acidic compound into at least one side of the cross-linked hydrocarbon-based anion-exchange membrane is not particularly limited, and commonly-known method can be employed without modification. The following method is a typical method generally industrially employed.

For example, there may be mentioned a method in which the polymerizable acidic compound is, directly or after being dissolved or dispersed in an appropriate solvent, applied or sprayed on the surface of the cross-linked hydrocarbon-based anion-exchange membrane. Furthermore, a method, in which the cross-linked hydrocarbon-based anion-exchange membrane is immersed in a solution or fluid dispersion containing the polymerizable acidic compound, with removing, if necessary, excessively impregnated polymerizable acidic compound, is particularly preferable because the impregnation of the polymerizable acidic compound into the surface region of the exchange membrane is excellent according to this method.

As a possible solvent for dissolving or dispersing the polymerizable acidic compound, for example, water, methanol, ethanol, etc., may be used independently or in a mixture of these solvents. The concentration of the solution or fluid dispersion is not particularly limited, and the concentration of the solution or fluid dispersion is preferably 500 to 8000 ppm, further preferably 2000 to 7000 ppm, in case of immersing. Also, in case of applying or spraying, the concentration is preferably 100 to 5000 ppm, further preferably 500 to 4000 ppm.

Furthermore, other procedure can be used, in which the cross-linked hydrocarbon-based anion-exchange membrane and cation-exchange membrane are alternately set in an electrodialytic tank followed by circulating a solution containing the polymerizable acidic compound either when applying current or not. In this case, the concentration of the solution containing the polymerizable acidic compound is preferably 50 to 2000 ppm, further preferably 100 to 1000 ppm.

In the present invention, the compound having specific molecular weight is used as the polymerizable acidic compound, so that the cross-linked hydrocarbon-based anion-exchange membrane is impregnated with the polymerizable acidic compound in to make a concentration of the polymerizable acidic compound in a surface region of the exchange membrane higher than a concentration of the polymerizable acidic compound in a central region of the exchange membrane. Although it is difficult to determine an impregnated depth and concentration of the polymerizable acidic compound in the cross-linked hydrocarbon-based anion-exchange membrane, it is possible to confirm that concentration gradient of the polymerizable acidic compound is formed in the cross-linked hydrocarbon-based anion-exchange membrane because the surface region is more highly ion-complexed than the central region in the modified anion-exchange membrane obtained by polymerizing the impregnated polymerizable acidic compound as mentioned below.

Conditions for impregnating of the polymerizable acidic compound into the surface region of the cross-linked hydrocarbon-based anion-exchange membrane at a higher concentration are not particularly limited, and may be determined in view of molecular weight of the polymerizable acidic compound, temperature at impregnation, time, degree of cross-linkage of the cross-linked hydrocarbon-based anion-exchange membrane, etc. Generally, the smaller the molecular weight of the polymerizable acidic compound is, the deeper the impregnated depth of the polymerizable acidic compound is, so that even the inside of the membrane may be uniformly impregnated with the polymerizable acidic compound. On the other hand, the larger the molecular weight of the polymerizable acidic compound is, the shallower the impregnated depth is, causing relatively higher concentration in the surface region than in the central region. Also, when the temperature at impregnation is high, the impregnated depth may be deeper, and low temperature may cause shallow depth. Also, when impregnating time is longer, the impregnated depth may be deeper, and shorter time may cause shallow depth. Also, when the degree of cross-linkage of the cross-linked hydrocarbon-based anion-exchange membrane is low, the impregnated depth may be deeper, and higher degree of cross-linkage may cause shallow depth.

(Polymerization)

After impregnation into the cross-linked hydrocarbon-based anion-exchange membrane, the polymerizable acidic compound is polymerized, and the surface region in the cross-linked hydrocarbon-based anion-exchange membrane is subject to ion-complexation, so that the modified anion-exchange membrane can be obtained.

A method or conditions for polymerizing the polymerizable acidic compound are not particularly limited, and may be polymerized by commonly-known methods such as radical polymerization and cation polymerization, for example.

For example, the cross-linked hydrocarbon-based anion-exchange membrane impregnated with the polymerizable acidic compound is brought into contact with a solution containing a radical polymerization initiator or cation polymerization initiator, so that the polymerizable acidic compound can be polymerized.

Also, depending on the type of the polymerization initiator, it is possible to employ a way, in which at least one surface of the cross-linked hydrocarbon-based anion-exchange membrane is impregnated with a solution including the polymerizable acidic compound and polymerization initiator at a low temperature, followed by increasing temperature to polymerize the polymerizable acidic compound.

Furthermore, there may be used a way, in which both sides of the cross-linked hydrocarbon-based anion-exchange membrane is first impregnated with the polymerizable acidic compound, followed by bringing only one side into contact with the polymerization initiator. Note that it is preferable in any of the above cases that the polymerizable acidic compound is polymerized under a nitrogen atmosphere.

As the radical polymerization initiator, for example, a peroxide such as acetyl peroxide, benzoyl peroxide, lauroyl peroxide, potassium peroxodisulfate, ammonium peroxodisulfate, t-butyl hydroperoxide and hydrogen peroxide; and an azo compound such as azobisisobutyronitrile, azobis-2-amidinopropane and hydrochloride salts thereof;

as well as a redox initiator including hydrogen peroxide-ammonia, ethylamine, Fe(II) salt, etc.; peroxodisulfate-sodium sulfite, sodium bisulfite, triethanolamine, etc.; sodium perchlorate-sodium sulfite, etc.; may be preferably used.

As the cation polymerization initiator, a halogen compound such as aluminum chloride, zinc chloride, stannic chloride, titanium chloride, boron trifluoride and antimony pentachloride;

a protonic acid such as phosphoric acid, sulfuric acid, chlorosulfonic acid and perchloric acid; and an organometallic compound such as triethylaluminum; may be used.

Also, ionizing radiation may be sent to polymerize the compound.

The temperature of polymerizing the polymerizable acidic compound may be temperature of decomposition of the polymerizable acidic compound or lower, or the boiling point of the used solvent or lower. Also, polymerizing time differs depending on the kind of the used solvent, polymerizing temperature, etc. and cannot be determined flatly. In general, the time is preferably 5 minutes to 10 hours or so when using the redox initiator, and the time is preferably 3 hours to 3 days or so when using the radical polymerization initiator.

(Modified Hydrocarbon-Based Anion-Exchange Membrane)

After the above described steps, a modified hydrocarbon-based anion-exchange membrane can be obtained, in which the surface region of the cross-linked hydrocarbon-based anion-exchange membrane is more highly ion-complexed than the central region.

The ion-complexation ("ion-complexed") here means a condition where an anion-exchange group in the cross-linked hydrocarbon-based anion-exchange membrane which is a base material is neutralized by an acidic moiety in the polymer of the polymerizable acidic compound (hereinafter referred to as an "acidic polymer") to lose anion-exchange ability. The modified hydrocarbon-based anion-exchange membrane of the present invention is impregnated with the polymerizable acidic compound such that the concentration of the polymerizable acidic compound in the surface region of the cross-linked hydrocarbon-based anion-exchange membrane which is a base material is higher than the concentration of the polymerizable acidic compound in the central region of the same exchange membrane, followed by polymerizing the polymerizable acidic compound. It results in high concentration of an acidic moiety derived from the acidic polymer present in the surface region. As a result, the anion-exchange group in the base material may easily be neutralized and inactivated by the acidic moiety derived from the acidic polymer in the surface region of the membrane. On the other hand, ion-exchange ability can be maintained because of low concentration of the acidic moiety derived from the acidic polymer in the central region of the anion-exchange membrane.

Consequently, the level of ion-complexation in the membrane can be evaluated by measuring a distribution state of the group ion-complexed to lose ion-exchange ability and the group still having ion-exchange ability. In the present invention, an ion-exchangeable anion in the modified hydrocarbon-based anion-exchange membrane is ion-exchanged into a Cl (chloride ion), and Cl ion cumulative intensity in thickness direction of the ion-exchanged membrane is measured by X-ray microanalyzer analysis (EPMA), so that the distribution state of the ion-complexed ion-exchange group can be evaluated.

There is no ion-exchange into Cl in the group ion-complexed to lose ion-exchange ability while ion-exchange into Cl occurs in the group having ion-exchange ability, so that a region with small Cl distribution indicates more highly ion-complexed region.

In the modified hydrocarbon-based anion-exchange membrane of the present invention, the surface region in at least one side of the membrane is more highly ion-complexed than the central region of the membrane. Note that the highly ion-complexed region may be formed at both sides of the membrane.

The distribution state of the ion-complexed region in thickness direction of the Cl ion exchanged membrane can be confirmed by comparing Cl ion cumulative intensity in a relatively shallow region near the membrane surface to Cl ion cumulative intensity in a region from the membrane surface through the central part.

In this context, the distribution state of the ion-complexed region is evaluated for the Cl ion exchanged membrane based on a ratio ($Cl_{0.3}/Cl_{0.5}$) of a Cl ion cumulative intensity ($Cl_{0.3}$) in a region from the membrane surface to a depth of 0.3 T and a Cl ion cumulative intensity ($Cl_{0.5}$) in a region from the surface to a depth of 0.5 T where an overall thickness of the modified hydrocarbon-based anion-exchange membrane is defined as T.

By comparison, in a cross-linked anion-exchange membrane without ion-complexation (untreated membrane), entire anion-exchange groups in the membrane have anion-exchange ability, so that anions of entire anion-exchange groups are ion-exchanged into Cl. Consequently, Cl ion can be uniformly distributed throughout the membrane. Therefore, $Cl_{0.3}/Cl_{0.5}$ is almost equal to an area of the measured region, i.e. 0.3/0.5, and is about 0.6.

On the other hand, in the modified hydrocarbon-based anion-exchange membrane of the present invention, the surface region in at least one side of the membrane is more highly ion-complexed than the central region of the membrane. Consequently, the Cl ion exchanged membrane is notably declined in the Cl ion cumulative intensity ($Cl_{0.3}$) in the region from the membrane surface to the depth of 0.3 T, compared to the untreated membrane. On the other hand, there are more ion-exchange groups, not ion-complexed and maintaining its activity, in the central region of the membrane than in the surface region, so that its Cl ion cumulative intensity ($Cl_{0.5}$) in the region from the membrane surface to the depth of 0.5 T is more declined than in the untreated membrane, but it is less than the decline of $Cl_{0.3}$.

Consequently, $Cl_{0.3}/Cl_{0.5}$ can be less than 0.6 in the modified hydrocarbon-based anion-exchange membrane in which its surface region is ion-complexed.

FIG. 2 shows a typical example of a Cl ion intensity spectrum by EPMA analysis for the modified hydrocarbon-based anion-exchange membrane after ion-exchanging into a Cl ion. The curve in FIG. 2 shows Cl ion intensity in a predetermined depth. Consequently, a Cl ion cumulative intensity ($Cl_{0.3}$) in the region from the membrane surface to the depth of 0.3 T is an area surrounded by the curve, X-axis and a perpendicular line at 0.3 T. Similarly, a Cl ion cumulative intensity ($Cl_{0.5}$) in the region from the membrane surface to the depth of 0.5 T is an area surrounded by the curve, X-axis and a perpendicular line at 0.5 T.

In the modified hydrocarbon-based anion-exchange membrane of the present invention, $Cl_{0.3}/Cl_{0.5}$ for the Cl ion exchanged membrane is preferably in the range of 0.05 to 0.55, further preferably in the range of 0.10 to 0.52, particularly preferably in the range of 0.20 to 0.50. $Cl_{0.3}/Cl_{0.5}$ can be controlled by how the cross-linked anion-exchange membrane which is a base material is impregnated with the polymerizable acidic compound.

For example, when using the polymerizable acidic compound with relatively high molecule, the central region of the membrane is not impregnated with the polymerizable acidic compound. As a result, the Cl ion cumulative intensity ($Cl_{0.3}$) in the surface region is declined, but the decline in $Cl_{0.5}$ is small. Therefore, $Cl_{0.3}/Cl_{0.5}$ becomes small. On the other hand, when using the polymerizable acidic compound with relatively low molecule, even the central region of the membrane is easily impregnated with the polymerizable acidic compound, and the declined level of $Cl_{0.3}$ shows little difference from the declined level of $Cl_{0.5}$, so that $Cl_{0.3}/Cl_{0.5}$ is not decreased.

Note that the anion-exchange groups particularly in the surface region are ion-complexed to lose anion-exchange ability, which does not mean any anion-exchange group disappears, in the modified hydrocarbon-based anion-exchange membrane of the present invention. For example, when the anion-exchange group is a quaternary ammonium group ($NR_4^+$), the quaternary ammonium group is neutralized by forming an ion complex with an acidic moiety derived from the acidic polymer (e.g. carboxylic acid group, COOH), which causes to lose anion-exchange ability, while the quaternary ammonium group ($NR_4^+$) itself still exists. The quaternary ammonium group exists with being uniformly dispersed in the separation membrane.

Consequently, when a distribution of an element derived only from the anion-exchange group (for example, nitrogen in quaternary ammonium group, sulfur in sulfonium base, etc.) is measured by EPMA for the modified hydrocarbon-based anion-exchange membrane of the present invention, it is found that the anion-exchange groups are uniformly dispersed in the membrane. For example, when the element derived only from the anion-exchange group is nitrogen (N), a ratio ($N_{0.3}/N_{0.5}$) of a nitrogen cumulative intensity ($N_{0.3}$) in the region from the membrane surface to the depth of 0.3 T and a nitrogen cumulative intensity ($N_{0.5}$) in the region from the membrane surface to the depth of 0.5 T is approximately 0.6.

In the above modified hydrocarbon-based anion-exchange membrane, durability of the membrane is high and methanol permeation resistance is improved because the membrane surface is more highly ion-complexed than the central region. On the other hand, the level of ion-complexation in the central region of the membrane is low, so that hydroxide ion conductivity of its raw membrane can be almost kept. Namely, the surface region of the modified hydrocarbon-based anion-exchange membrane is highly ion-complexed, resulting in effectively inhibited methanol crossover phenomenon as well as high hydroxide ion conductivity.

(Separation Membrane for Fuel Cell)

Thus-produced modified hydrocarbon-based anion-exchange membrane can be particularly preferably used as a separation membrane for a direct liquid fuel type fuel cell.

When used as a separation membrane for a fuel cell, the modified hydrocarbon-based anion-exchange membrane is commonly used after ion-exchanging a counterion of the anion-exchange group maintaining anion-exchange ability into a hydroxide ion. For exchanging the counterion into the hydroxide ion, said modified hydrocarbon-based anion-exchange membrane is preferably immersed in about 0.05 to 1 mol/L of an aqueous solution of potassium hydroxide, sodium hydroxide, etc., for 0.1 to 10 hours, and it is preferable to repeat the procedure 1 to 5 times for easily attaining the ion-exchange.

Note that the present inventors have keenly studied about the structure and nature of the anion-exchange membrane, and found that carbon dioxide in the air is absorbed and rapidly reacted with the counterion species, i.e. hydroxide ion, to substitute with a carbonate ion followed by further substitution with a bicarbonate ion when the counterion species of the anion-exchange membrane is a hydroxide ion, i.e. in a hydroxide ion type anion-exchange membrane.

However, the carbonate ion and/or bicarbonate ion are substituted with (ion-exchanged into) a hydroxide ion generated in a catalytic reaction during power generation of a fuel cell when operating the fuel cell, so that the carbonate ion and/or bicarbonate ion are released as a carbon dioxide to the outside of the fuel cell system. Therefore, it is possible to use the membrane in a fuel cell without problems even when a part or all of the counterion species of the anion-exchange membrane (hydroxide ions) are substituted with the carbonate ion and/or bicarbonate ion.

The separation membrane for a fuel cell using the modified hydrocarbon-based anion-exchange membrane of the present invention is normally joined to gas diffusion electrodes at its both sides when used. For a gas diffusion electrode, any of the commonly-known to be used in a solid electrolyte type fuel cell is applicable without particular limitation. In general, the gas diffusion electrode comprises a catalyst electrode layer in which a metallic particle as the catalyst and a conductive agent are dispersed, which is supported by an electrode base material comprising porous material.

This catalyst is not particularly limited if it is any metal accelerating oxidation reaction of a fuel such as hydrogen and methanol and a reduction reaction of oxygen, and for example, platinum, gold, silver, palladium, iridium, rhodium, ruthenium, tin, iron, cobalt, nickel, molybdenum, tungsten, vanadium or an alloy thereof. Among these catalysts, the platinum, ruthenium or an alloy of platinum and ruthenium, superior in catalyst activity, are often used.

A particle diameter of the metallic particle to be the above catalyst is normally 0.1 to 100 nm, more preferably 0.5 to 10 nm. Smaller particle diameter results in higher catalyst performance, but it is difficult to produce the metallic particle with a particle diameter of less than 0.5 nm while sufficient catalyst performance can hardly be obtained for the one with a particle diameter of more than 100 nm.

Content of the above catalyst is normally 0.01 to 10 mg/cm$^2$, more preferably 0.1 to 5.0 mg/cm$^2$, when the catalyst electrode layer is sheeted. When the content of the catalyst is 0.01 mg/cm$^2$ or less, the catalyst may not fully deliver its performance; and when more than 10 mg/cm$^2$ of the catalyst is supported, its performance may be saturated. Note that these catalysts may be preliminarily supported by the conductive agent before the use.

The conductive agent is not particularly limited if it is an electron conducting substance, and for example, carbon black such as furnace black and acetylene black, activated carbon, black lead, etc. are independently or mixed to use.

Also, the catalyst electrode layer preferably includes a binding agent, etc., in addition to the above catalyst and conductive agent. As the binding agent, a polymer having hydroxide ion conductivity is preferred, and there may be illustrated, for example, an aminated polymer such as chloro methylated-{polystyrene-poly(ethylene-butylene)-polystyrene}triblock copolymer. Also, the binding agent may include a polymer without an anion-exchange group such as polytetrafluoroethylene, polyvinylidene fluoride, tetrafluoroethylene-perfluoroalkyl vinyl ether copolymer, polyether ether ketone, polyether sulfone, styrene-butadiene copolymer and acrylonitrile-butadiene copolymer. Content of the binding agent is preferably 5 to 25 wt % of the above catalyst electrode layer. Also, the binding agent may be used independently and in a mixture of two or more.

For the electrode base material which supports the catalyst electrode layer including these components, porous base material is used, and specifically, carbon fiber fabric cloth, carbon paper, etc. may be used. Its thickness is preferably 50 to 300 μm, and its porosity is preferably 50 to 90%.

Void of the above electrode base material is filled with said catalyst electrode layer, and the catalyst electrode layer is also attached to a surface of the base material at the joining side with the modified hydrocarbon-based anion-exchange membrane to have a thickness of 5 to 50 μm, so that the gas diffusion electrode is formed. As its common production method, there may be mentioned a method in which a catalyst electrode layer paste obtained by mixing each of said components and an organic solvent is applied to the electrode base material followed by drying. Also generally, viscosity of the above catalyst electrode layer paste may tentatively be controlled by adding the same organic solvent in order to control an amount of the catalyst supported and a thickness of the catalyst electrode phase.

Thermocompression bonding when producing the modified hydrocarbon-based anion-exchange membrane/gas diffusion electrode assembly is performed by using an apparatus able to pressurize and heat. In general, hot press, roll press, etc. may be used. Pressing temperature is generally 80° C. to 200° C. Pressure depends on the thickness and hardness of the gas diffusion electrode, and is normally 0.5 to 20 MPa.

The modified hydrocarbon-based anion-exchange membrane/gas diffusion electrode assembly produced by thermocompression bonding as described above is installed and used in a solid electrolyte type fuel cell having the above-mentioned basic structure as shown in FIG. 1.

EXAMPLE

Hereinafter, the present invention will be explained further in detail by using examples, but the present invention is not limited to these examples. Note that the anion exchange capacity and water content, thickness of membrane, anion conductivity, methanol permeation resistance and level of ion-complexation in Examples and Comparative Examples are measurement values obtained by the following method.

1) Anion Exchange Capacity and Water Content

The anion-exchange membrane was immersed in 1 mol/L-HCl aqueous solution for 10 hours or more to change it into a chloride ion type, followed by changing it further into a nitrate ion type with 0.5 mol/L-NaNO$_3$ aqueous solution to generate a free chloride ion. The free chloride ion was titrated with silver nitrate aqueous solution by potentiometric titrator (COMTITE-900 by Hiranuma Sangyo Co., Ltd.) (A mol). Next, the same ion exchange membrane was immersed in 1 mol/L-NaCl aqueous solution for 4 hours or more, and thoroughly washed by ion exchange water. Then, water on the surface of the membrane was wiped off with tissue paper, etc., and a weight of the moistened membrane (W g) was measured. Furthermore, the membrane was dried at 60° C. for 5 hours under reduced pressure to measure the dried weight (D g). Based on the above measurements, ion exchange capacity and water content were obtained by the following formula.

Ion exchange capacity=$A \times 1000/D$[mmol/g–dried weight]

Water content=$100 \times (W-D)/D$[%]

2) Thickness of Membrane

The thickness of the membrane was measured by a micrometer in the dry state.

3) Anion Conductivity

The anion-exchange membrane was immersed in 0.5 mol·L$^{-1}$-NaOH aqueous solution for 10 hours or more, washed with ion-exchange water 3 times and then left in the air in the dry state for 24 hours or more. This was moistened by ion-exchange water at 40° C., followed by cutting to prepare a reed-shaped sample of the anion-exchange membrane with a width of about 6 cm and a length of 2.0 cm. Then, an insulating substrate was prepared by arranging 5 platinum wires with line width of 0.3 mm, with an interval of 0.5 cm in a transverse direction (same direction as a transverse direction of the anion-exchange membrane), and in a linear fashion parallel to each other and parallel to a longitudinal direction (same direction as a longitudinal direction of the anion-exchange membrane). A sample for measurements was prepared by pressing said platinum wire of the insulating substrate against said anion-exchange membrane.

For the sample for the above measurements, each AC impedance of between the first and second platinum wires (platinum wire distance=0.5 cm), between the first and third platinum wires (platinum wire distance=1.0 cm), between the first and forth platinum wires (platinum wire distance=1.5 cm) and between the first and fifth platinum wires (platinum wire distance=2.0 cm) was measured. A slope between resistance poles (R) was obtained from a graph obtained by plotting each measurement with a distance between platinum wires on the x-axis and AC impedance on the y-axis, and anion conductivity (σ) was obtained based on the following formula. In this case, the AC impedance was measured under the condition such that 1 kHz of AC was applied between the platinum wires while the sample for measurements was kept in a thermo-hygrostat at 40° C. at 90% RH to make droplet of ion exchange water generated on the surface of the anion-exchange membrane. Also, thickness of membrane (L) was measured by moistening the anion-exchange membrane with ion exchange water.

σ=$1/R \times 2.0 \times L$

σ: conductivity [S·cm$^{-1}$]
L: thickness of membrane [cm]
R: slope between resistance poles [Ω·cm$^{-1}$]

Note that the distance between platinum wires and AC impedance bore a linear relation (proportional relation) in the above graph, and that a resistance by contacting between the platinum wire and anion-exchange membrane (contact resistance) in the measured sample was evaluated as y-intercept, so that it was possible to calculate the slope between resistance poles (R), meaning a specific resistance of the membrane, from the slope of the graph. In the measurements, the anion conductivity (a) was obtained based on the slope between resistance poles (R), resulting in eliminating an influence of the above contact resistance.

4) Methanol Permeation Resistance

The anion-exchange membrane was left in the air at room temperature for 24 hours.

An aqueous solution with a methanol concentration of 30 mass % was supplied by a liquid chromatography pump into one of chambers of a fuel cell in which the above anion-exchange membrane was mounted in the center (where an area of the separation membrane was 5 cm$^2$); and argon gas was supplied into another chamber opposite to the separation membrane at 300 ml/min. Measurements were performed in a thermostat bath at 25° C. Methanol concentration in argon gas flowing out of the opposite chamber to the separation membrane was measured by gas chromatography to obtain a methanol amount permeating the separation membrane. Methanol permeation resistance was determined as a reciprocal of the amount of the permeated methanol.

5) Level of Ion-Complexation

For the modified anion-exchange membrane produced for the Example, a variety of anion-exchange membranes used for the reference example and comparative example, the separation membrane was immersed in 0.5 mol/L of sodium chloride solution for 16 hours, sufficiently washed with water and air-dried, followed by cutting with a cutter to prepare a reed-shaped sample with a width of 2 mm and a length of 10 mm. The samples were embedded by epoxy resin. After the epoxy resin was cured, a sample in which a cross-section of the membrane was exposed was prepared by microtome. The obtained samples were subject to carbon deposition, and then, X-ray microanalyzer analysis (EPMA) was done on the cross-section in the following conditions to measure Cl ion intensity.

(Measurements)

Apparatus JXA-8621M by Japan Electron

Conditions: accelerating voltage of 15 kV, illumination current of $1.0 \times 10^{-8}$ A Accumulation: Line analysis was performed for the anion-exchange membrane in thickness direction. Spectrum was obtained from the average strength based on 50 accumulations. A ratio ($Cl_{0.3}/Cl_{0.5}$) of a Cl ion cumulative intensity ($Cl_{0.3}$) in a region from a top surface of at least one side of the modified anion-exchange membrane to a depth of 0.3 T and a Cl ion cumulative intensity ($Cl_{0.5}$) in a region from the top surface to a depth of 0.5 T was calculated when an overall thickness of the anion-exchange membrane was defined as T.

The smaller $Cl_{0.3}/Cl_{0.5}$ means that the surface region of the membrane was more highly ion-complexed than the central region.

6) Fuel Cell Output

Chloromethylated-{polystyrene-poly(ethylene-butylene)-polystyrene} triblock copolymer (styrene content: 30 mass %) was immersed in an aqueous solution containing 6 mass % of trimethylamine and 25 mass % of acetone at room temperature for 16 hours, and further immersed in 0.5 mol/L-NaOH aqueous solution for 10 hours or more to synthesize binder resin for catalyst electrode layer (hydroxide ion type).

The binder resin had a weight-average molecular weight of 30000, and its anion exchange capacity was 1.5 mmol/g-dried resin.

This binder resin was dissolved in a solvent containing a mixture of equal mass of tetrahydrofuran and 1-propanol to obtain a binder resin solution with a concentration of 5 mass %.

Then, the above binder resin solution was mixed with carbon black supporting 50 mass % of platinum-ruthenium alloy catalyst (ruthenium 50 mol %) to prepare a catalyst electrode layer forming slurry. The slurry was applied on carbon paper having a thickness of 100 μm and porosity of 80% treated by polytetrafluoroethylene for water-repellent treatment to have a catalyst concentration of 2 mg·cm$^{-2}$, followed by drying under reduced pressure at 80° C. for 4 hours to obtain a fuel chamber side diffusion electrode having a catalyst electrode layer.

Separately, an oxidizing agent chamber side gas diffusion electrode was prepared by using carbon black supporting 50 mass % of platinum as with the above fuel chamber side diffusion electrode.

Next, the above fuel chamber side diffusion electrode and oxidizing agent chamber side gas diffusion electrode were respectively set in both surfaces of the separation membrane for a fuel cell to be measured, and after hot press at 100° C. under a pressure of 5 MPa for 100 seconds, it was left at room temperature for 2 minutes, so that a separation membrane for a fuel cell/catalyst electrode assembly was obtained. This was installed in a fuel cell having the structure shown in FIG. 1. The temperature of the fuel cell was set at 50° C., 10 mass % of methanol aqueous solution was supplied into the fuel chamber side, and air at atmospheric pressure was supplied into the oxidizing agent chamber side at 200 ml·min.$^{-1}$ to perform a power generation test. In the test, terminal voltage of the cell was measured at current density of 0 A·cm$^{-2}$ and 0.1 A·cm$^{-2}$ after stabilizing by operating at low voltage with cell voltage of 0.2V for 30 minutes.

Reference Example 1

Polyethylene porous film (with thickness of membrane of 25 μm and porosity of 36%) was impregnated with a mixed solution of 95 parts by weight of chloromethylstyrene, 5 parts by weight of a crosslinking agent, i.e. divinylbenzene, and 5 parts by weight of a polymerization initiator, i.e. peroxidebenzoyl. Both sides of the film were covered with polyester films with a thickness of 100 μm, and thermal polymerization was done under 0.3 MPa-nitrogen atmosphere. The obtained membrane-shaped material was further immersed in an aqueous solution containing 6 wt % of trimethylamine and 25 wt % of acetone at room temperature for 16 hours, and then immersed in excessively large amount of 0.5 mol·L$^{-1}$-NaOH aqueous solution to ion-exchange the counterion from chloride ion to hydroxide ion, followed by washing with ion-exchange water to obtain the separation membrane for a fuel cell. For the obtained separation membrane, anion exchange capacity, water content, thickness of membrane, ($Cl_{0.3}/Cl_{0.5}$) value, anion conductivity, methanol permeation resistance and fuel cell output are shown in Table 1.

Reference Example 2

Except for using 90 parts by weight of chloromethylstyrene and 10 parts by weight of the crosslinking agent, i.e. divinylbenzene, a separation membrane for a fuel cell was obtained by the procedures as in Reference Example 1. For the obtained separation membrane, anion exchange capacity, water content, thickness of membrane, ($Cl_{0.3}/Cl_{0.5}$) value, anion conductivity, methanol permeation resistance and fuel cell output are shown in Table 1.

Reference Example 3

Except for using 80 parts by weight of chloromethylstyrene and 20 parts by weight of the crosslinking agent, i.e. divinylbenzene, a separation membrane for a fuel cell was obtained by the procedures as in Reference Example 1. For the obtained separation membrane, anion exchange capacity, water content, thickness of membrane, ($Cl_{0.3}/Cl_{0.5}$) value, anion conductivity, methanol permeation resistance and fuel cell output are shown in Table 1.

Reference Example 4

Except for using 98 parts by weight of chloromethylstyrene and 2 parts by weight of the crosslinking agent, i.e. divinylbenzene, a separation membrane for a fuel cell was obtained by the procedures as in Reference Example 1. For the obtained separation membrane, anion exchange capacity, water content, thickness of membrane, ($Cl_{0.3}/Cl_{0.5}$) value, anion conductivity, methanol permeation resistance and fuel cell output are shown in Table 2.

From the above results, it is possible to confirm that the increased degree of cross-linkage results in the improved methanol permeation resistance and reduced anion conductivity in the hydrocarbon-based anion-exchange membrane, i.e. the anion conductivity and methanol permeation resistance have trade-off relations (Reference Examples 1 to 4).

Production Example 1

1 g of di-t-butyl peroxide was dissolved in 20 g of acrylic acid butyl ester, and the resulting solution was placed in a stainless-steel pressure vessel with an inner volume of 100 ml to react in oil bath at 270° C. for 15 minutes. Then, the product was taken out, and subject to hydrolysis reaction in 1 mol/L of sodium hydroxide solution (solvent: a mixture of equal amounts of ethanol and water) at 40° C. for 24 h, so that a polyacrylic acid polymer was obtained. This polyacrylic acid polymer was analyzed by $^1$H-NMR to confirm that this was a polymerizable acidic compound comprising a mixture of those having ethylenically unsaturated groups at both ends of its molecular chain and those having an ethylenically unsaturated group only at one end. Molecular weight of this polymerizable acidic compound was measured by gel permeation chromatography (GPC) to obtain weight-average molecular weight of 1200.

Production Example 2

1 g of di-t-butyl peroxide was dissolved in a mixture of 5 g of acrylic acid butyl ester and 15 g of methacrylic acid butyl ester, and the resulting solution was placed in a stainless-steel pressure vessel with an inner volume of 100 ml to react in oil bath at 270° C. for 15 minutes. Then, the product was taken out, and subject to hydrolysis reaction in 1 mol/L of sodium hydroxide solution (solvent: a mixture of equal amounts of ethanol and water) at 40° C. for 24 h, so that a poly(acrylic acid-methacrylic acid) random copolymer was obtained. This poly(acrylic acid-methacrylic acid) random copolymer was analyzed by $^1$H-NMR to confirm that this was a polymerizable acidic compound comprising a mixture of those having ethylenically unsaturated groups at both ends of its molecular chain and those having an ethylenically unsaturated group only at one end. It was also confirmed that molar ratio of the acrylic acid/methacrylic acid was 10.3/28.8. Molecular weight of this polymerizable acidic compound was measured by gel permeation chromatography (GPC) to obtain weight-average molecular weight of 2100.

Production Example 3

0.3 g of di-t-butyl peroxide was dissolved in a mixture of 5 g of acrylic acid butyl ester and 15 g of methacrylic acid butyl ester, and the resulting solution was placed in a stainless-steel pressure vessel with an inner volume of 100 ml to react in oil bath at 270° C. for 1.5 hours. Then, the product was taken out, and subject to hydrolysis reaction in 1 mol/L of sodium hydroxide solution (solvent: a mixture of equal amounts of ethanol and water) at 40° C. for 24 h, so that poly(acrylic acid-methacrylic acid) random copolymer was obtained. This poly(acrylic acid-methacrylic acid) random copolymer was analyzed by $^1$H-NMR to confirm that this was a polymerizable acidic compound comprising a mixture of those having ethylenically unsaturated groups at both ends of its molecular chain and those having an ethylenically unsaturated group only at one end. Molecular weight of this polymerizable acidic compound was measured by gel permeation chromatography (GPC) to obtain weight-average molecular weight of 4700.

Production Example 4

0.1 g of di-t-butyl peroxide was dissolved in a mixture of 5 g of acrylic acid butyl ester and 15 g of methacrylic acid butyl ester, and the resulting solution was placed in a stainless-steel pressure vessel with an inner volume of 100 ml to react in oil bath at 270° C. for 3 hours. Then, the product was taken out, and subject to hydrolysis reaction in 1 mol/L of sodium hydroxide solution (solvent: a mixture of equal amounts of ethanol and water) at 40° C. for 24 h, so that a poly(acrylic acid-methacrylic acid) random copolymer was obtained. This poly(acrylic acid-methacrylic acid) random copolymer was analyzed by $^1$H-NMR to confirm that this was a polymerizable acidic compound comprising a mixture of those having ethylenically unsaturated groups at both ends of its molecular chain and those having an ethylenically unsaturated group only at one end. It was also confirmed that molar ratio of the acrylic acid/methacrylic acid was 33.0/92.4. Molecular weight of this polymerizable acidic compound was measured by gel permeation chromatography (GPC) to obtain weight-average molecular weight of 6500.

Production Example 5

0.1 g of di-t-butyl peroxide was dissolved in a mixture of 5 g of acrylic acid butyl ester and 15 g of methacrylic acid butyl ester, and the resulting solution was placed in a stainless-steel pressure vessel with an inner volume of 100 ml to react in oil bath at 270° C. for 5 hours. Then, the product was taken out, and subject to hydrolysis reaction in 1 mol/L of sodium hydroxide solution (solvent: a mixture of equal amounts of ethanol and water) at 40° C. for 24 h, so that a poly(acrylic acid-methacrylic acid) random copolymer was obtained. This poly(acrylic acid-methacrylic acid) random copolymer was analyzed by $^1$H-NMR to confirm that this was a polymerizable acidic compound comprising a mixture of those having ethylenically unsaturated groups at both ends of its molecular chain and those having an ethylenically unsaturated group only at one end. Molecular weight of this polymerizable acidic compound was measured by gel permeation chromatography (GPC) to obtain weight-average molecular weight of 7200.

Production Example 6

1 g of di-t-butyl peroxide was dissolved in 20 g of acrylic acid butyl ester, and the resulting solution was placed in a stainless-steel pressure vessel with an inner volume of 100 ml to react in oil bath at 270° C. for 5 minutes. Then, the product was taken out, and subject to hydrolysis reaction in 1 mol/L of sodium hydroxide solution (solvent: a mixture of equal amounts of ethanol and water) at 40° C. for 24 h, so that a polyacrylic acid polymer was obtained. This polyacrylic acid polymer was analyzed by $^1$H-NMR to confirm that this was a polymerizable acidic compound comprising a mixture of those having ethylenically unsaturated groups at both ends of its molecular chain and those having an ethylenically unsaturated group only at one end. Molecular weight of this polymerizable acidic compound was measured by gel permeation chromatography (GPC) to obtain weight-average molecular weight of 430.

Production Example 7

0.1 g of di-t-butyl peroxide was dissolved in a mixture of 5 g of acrylic acid butyl ester and 15 g of methacrylic acid butyl ester, and the resulting solution was placed in a stainless-steel pressure vessel with an inner volume of 100 ml to react in oil bath at 210° C. for 5 hours. Then, the product was taken out, and subject to hydrolysis reaction in 1 mol/L of sodium hydroxide solution (solvent: a mixture of equal amounts of ethanol and water) at 40° C. for 24 h, so that a poly(acrylic acid-methacrylic acid) random copolymer was obtained. This poly(acrylic acid-methacrylic acid) random copolymer was analyzed by $^1$H-NMR to confirm that this was a polymerizable acidic compound comprising a mixture of those having ethylenically unsaturated groups at both ends of its molecular chain and those having an ethylenically unsaturated group only at one end. Molecular weight of this polymerizable acidic compound was measured by gel permeation chromatography (GPC) to obtain weight-average molecular weight of 12000.

Example 1

Polyethylene porous film (with thickness of membrane 25 μm and porosity of 36%) was impregnated with a mixed solution of 95 parts by weight of chloromethylstyrene, 5 parts by weight of a crosslinking agent, i.e. divinylbenzene, and 5 parts by weight of a polymerization initiator, i.e. peroxide-benzoyl. Both sides of the film were covered with polyester films with a thickness of 100 μm, and thermal polymerization was done under 0.3 MPa-nitrogen atmosphere at 80° C. for 5 hours. The obtained membrane-shaped material was further immersed in an aqueous solution containing 6 wt % of trimethylamine and 25 wt % of acetone at room temperature for 16 hours, followed by washing with ion-exchange water to obtain the crosslinkable hydrocarbon-based anion-exchange membrane (anion-exchange membrane of Reference Example 1).

An aqueous solution was prepared to make a concentration of the polymerizable acidic compound obtained in the Production Example 1 be 3000 ppm, and the above-described anion-exchange membrane with a size of 10 cm×30 cm was immersed in 0.5 L of the aqueous solution at room temperature for 3 hours. Then, without taking out the anion-exchange membrane, the solution was added with 1 g of azobisisobutyronitrile as the polymerization initiator, and reacted at 50° C. for 6 hours, so that a separation membrane for a fuel cell obtained by modifying the anion-exchange membrane was produced. After the reaction, the separation membrane was immersed in 3 mass % of sodium chloride solution to remove unreacted monomer, etc. Then, the separation membrane was immersed in excessively large amount of 0.5 mol·L$^{-1}$-NaOH aqueous solution to ion-exchange its counterion from chloride ion to hydroxide ion, followed by washing with ion-exchange water. For the prepared membrane for a fuel cell, anion exchange capacity, water content, thickness of membrane, ($Cl_{0.3}/Cl_{0.5}$) value, anion conductivity, methanol permeation resistance and fuel cell output are shown in Table 1.

Example 2

Except for changing the concentration of the polymerizable acidic compound aqueous solution to treat the hydrocarbon-based anion exchange membrane therewith to 6000 ppm, a separation membrane for a fuel cell was prepared by the same method as in Example 1. For the prepared separation membrane, anion exchange capacity, water content, thickness of membrane, ($Cl_{0.3}/Cl_{0.5}$) value, anion conductivity, methanol permeation resistance and fuel cell output are shown in Table 1.

Example 3

An aqueous solution was prepared to make a concentration of the polymerizable acidic compound obtained in the Production Example 2 be 3000 ppm, and the anion-exchange membrane of Reference Example 1 with a size of 10 cm×30 cm was immersed in 0.5 L of the aqueous solution at room temperature for 3 hours. Then, without taking out the anion-exchange membrane, the solution was added with 1 g of azobisisobutyronitrile as the polymerization initiator, and reacted at 50° C. for 6 hours, so that a separation membrane for a fuel cell obtained by modifying the anion-exchange membrane was produced. After the reaction, the separation membrane was immersed in 3 mass % of sodium chloride solution to remove unreacted monomer, etc. Then, the separation membrane was immersed in excessively large amount of 0.5 mol·L$^{-1}$-NaOH aqueous solution to ion-exchange its counterion from chloride ion to hydroxide ion, followed by washing with ion-exchange water. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 1.

Example 4

Except for changing the concentration of the polymerizable acidic compound aqueous solution to treat the hydrocarbon-based anion exchange membrane therewith to 6000 ppm, a separation membrane for a fuel cell was prepared by the same method as in Example 3. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 1.

Comparative Example 1

An aqueous solution was prepared to make a concentration of the polymerizable acidic compound obtained in the Production Example 6 be 3000 ppm, and the anion-exchange membrane of Reference Example 1 with a size of 10 cm×30 cm was immersed in 0.5 L of the aqueous solution at room temperature for 3 hours. Then, without taking out the anion-exchange membrane, the solution was added with 1 g of azobisisobutyronitrile as the polymerization initiator, and reacted at 50° C. for 6 hours, so that a separation membrane for a fuel cell obtained by modifying the anion-exchange membrane was produced. After the reaction, the separation membrane was immersed in 3 mass % of sodium chloride solution to remove unreacted monomer, etc. Then, the separation membrane was immersed in excessively large amount of 0.5 mol·L$^{-1}$-NaOH aqueous solution to ion-exchange its counterion from chloride ion to hydroxide ion, followed by washing with ion-exchange water. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 1.

Example 6

Except for using the crosslinkable hydrocarbon-based anion-exchange membrane of the Reference Example 4 and the polymerizable acidic compound produced in the Production Example 4, a separation membrane for a fuel cell was prepared by the same method as in Example 3. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 2.

Example 7

Except for using the crosslinkable hydrocarbon-based anion-exchange membrane of the Reference Example 4 and the polymerizable acidic compound produced by the Production Example 5, a separation membrane for a fuel cell was prepared by the same method as in Example 3. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 2.

Comparative Example 2

An aqueous solution was prepared to make a concentration of the polymerizable acidic compound obtained in the Production Example 7 be 3000 ppm, and the anion-exchange membrane of Reference Example 4 with a size of 10 cm×30 cm was immersed in 0.5 L of the aqueous solution at room temperature for 3 hours. Then, without taking out the anion-exchange membrane, the solution was added with 1 g of azobisisobutyronitrile as the polymerization initiator, and

TABLE 1

| Example | Ion-Exchange Capacity [mmol/g] | Water Content [%] | Thickness of Membrane [μm] | C10.3/C10.5 [—] | Anion Conductivity [S·cm$^{-2}$] | Methanol Permeation Resistance [(cm$^2$·hr)/g] | Fuel Cell Output Voltage [V] 0 A/cm$^2$ | Fuel Cell Output Voltage [V] 0.1 A/cm$^2$ |
|---|---|---|---|---|---|---|---|---|
| Reference Example 1 | 1.6 | 18 | 26 | 0.60 | 2.5 | 25 | 0.62 | 0.19 |
| Reference Example 2 | 1.2 | 14 | 25 | 0.60 | 1.0 | 125 | 0.72 | 0.15 |
| Reference Example 3 | 0.9 | 9 | 25 | 0.60 | 0.3 | 300 | 0.81 | 0.20 |
| 1 | 1.2 | 14 | 25 | 0.26 | 1.4 | 105 | 0.71 | 0.20 |
| 2 | 0.9 | 9 | 25 | 0.20 | 0.8 | 280 | 0.80 | 0.20 |
| 3 | 1.4 | 16 | 25 | 0.49 | 2.3 | 50 | 0.66 | 0.23 |
| 4 | 1.2 | 12 | 25 | 0.44 | 2.0 | 130 | 0.73 | 0.28 |
| Comparative Example 1 | 0.2 | 4 | 25 | 0.60 | 0.01 | 570 | 0.89 | unmeasurable |

Example 5

Except for using the crosslinkable hydrocarbon-based anion-exchange membrane of the Reference Example 4 and the polymerizable acidic compound produced by the Production Example 3, a separation membrane for a fuel cell was prepared by the same method as in Example 3. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 2.

reacted at 50° C. for 6 hours, so that a separation membrane for a fuel cell obtained by modifying the anion-exchange membrane was produced. After the reaction, the separation membrane was immersed in 3 mass % of sodium chloride solution to remove unreacted monomer, etc. Then, the separation membrane was immersed in excessively large amount of 0.5 mol·L$^{-1}$-NaOH aqueous solution to ion-exchange its counterion from chloride ion to hydroxide ion, followed by washing with ion-exchange water. For the prepared separation membrane for a fuel cell, anion exchange capacity, water content, thickness of membrane, ($Cl_{0.3}/Cl_{0.5}$) value, anion conductivity, methanol permeation resistance and fuel cell output are shown in Table 2.

TABLE 2

| Example | Ion-Exchange Capacity [mmol/g] | Water Content [%] | Thickness of Membrane [μm] | $C_{10.3}/C_{10.5}$ [—] | Anion Conductivity [$S \cdot cm^{-2}$] | Methanol Permeation Resistance [$(cm^2 \cdot hr)/g$] | Fuel Cell Output Voltage [V] 0 A/cm² | Fuel Cell Output Voltage [V] 0.1 A/cm² |
|---|---|---|---|---|---|---|---|---|
| Reference Example 4 | 1.8 | 34 | 27 | 0.60 | 5.8 | 18 | 0.58 | 0.15 |
| 5 | 1.6 | 28 | 27 | 0.50 | 4.8 | 34 | 0.66 | 0.18 |
| 6 | 1.7 | 30 | 27 | 0.53 | 5.2 | 29 | 0.64 | 0.17 |
| 7 | 1.7 | 31 | 27 | 0.54 | 5.4 | 27 | 0.62 | 0.16 |
| Comparative Example 2 | 1.8 | 35 | 28 | 0.59 | 5.7 | 19 | 0.60 | 0.15 |

EXPLANATION OF SYMBOLS

1: cell bulkhead
2: fuel flow hole
3: oxidizing gas flow hole
4: fuel chamber side diffusion electrode
5: oxidizing agent chamber side gas diffusion electrode
6: solid polymer electrolyte (modified anion-exchange membrane)
7: fuel chamber
8: oxidizing agent chamber

The invention claimed is:

1. A production method for making a separation membrane for a fuel cell comprising: preparing a cross-linked hydrocarbon-based anion-exchange membrane; modifying the cross-linked hydrocarbon-based anion-exchange membrane by impregnating at least one side of the cross-linked hydrocarbon-based anion-exchange membrane with a polymerizable acidic compound having weight-average molecular weight, where a weight of a counter cation is eliminated from the molecular weight when its acidic moiety of the compound is neutralized by the counter cation, of 700 or more to less than 8000; and after said impregnating, polymerizing the polymerizable acidic compound;
   wherein said polymerizable acidic compound is at least one selected from a polyacrylic acid polymer, a polymethacrylic acid polymer, a poly(acrylic acid-methacrylic acid) copolymer and salts thereof;
   wherein a surface region on at least one side of the separation membrane is highly ion-complexed compared to a central region of the separation membrane.

2. The production method as set forth in claim 1, wherein said hydrocarbon-based anion-exchange membrane is impregnated with said polymerizable acidic compound to make a concentration of the polymerizable acidic compound in a surface region of the exchange membrane higher than a concentration of the polymerizable acidic compound in a central region of the exchange membrane.

3. The production method as set forth in claim 1, wherein the acidic moiety of said polymerizable acidic compound is a carboxylic acid group.

4. The production method as set forth in claim 1, wherein said fuel cell is a direct liquid fuel type fuel cell.

5. The production method as set forth in claim 1, comprising:
   wherein the separation membrane has a ratio $Cl_{0.3}/Cl_{0.5}$, of a Cl ion cumulative intensity $Cl_{0.3}$ in a region from a top surface of at least one side of the modified anion-exchange membrane to a depth of 0.3 T and a Cl ion cumulative intensity $Cl_{0.5}$ in a region from the top surface to a depth of 0.5 T, of 0.05 to 0.55, wherein an overall thickness of the modified anion-exchange membrane is defined as T, when ion-exchanging an ion-exchangeable anion in said anion-exchange membrane into a Cl ion; and when calculating a cumulative intensity of the Cl ion in thickness direction of the ion-exchanged membrane by X-ray microanalyzer analysis.

6. The production method as set forth in claim 1, wherein said polymerizable acidic compound comprises a polymerizable poly(meth)acrylic compound having an ethylenically unsaturated group in at least one end of the molecular chain.

* * * * *